Patented Apr. 6, 1943

2,315,845

UNITED STATES PATENT OFFICE 2,315,845

WEAR TEST METHOD AND COMPOSITION

Seymour W. Ferris, Mount Holly, N. J., assignor to The Atlantic Refining Company, Philadelphia, Pa., a corporation of Pennsylvania No Drawing. Application October 25, 1941,
Serial No. 416,605

10 Claims. (Cl. 250—107)

The present invention relates to a method and means for determining wear of a surface, and more particularly to determining wear of metal surfaces such as bearings, pistons and cylinders of internal combustion engines, gears, and the like.

An object of this invention is the provision of a rapid and accurate method for determining wear of relatively moving parts, and for determining the effect upon wear of various lubricants, particularly while the parts are in relative motion.

A further object of this invention is the provision of wear-testing compositions or test pieces which may be employed in determining the effectiveness of lubricants in preventing wear.

It has been conventional practice in the determination of wear, particularly of metal surfaces, to measure the wear by the loss of weight or the change in dimensions of the metal parts. Such methods frequently are ineffective in determining very small amounts of wear, due to the inherent inaccuracies in weighing or measuring change in dimensions. Furthermore, such methods cannot be employed in determining wear while the parts are in relative motion, and therefore wear can only be determined upon the completion of the test period and not during such period, i. e., the parts or mechanism undergoing testing must be dismantled before weight or dimension measurements can be made.

In accordance with the present invention, I provide a wear-testing composition including a radioactive, substance, subject the composition to wear in the presence of a fluid capable of carrying radio-active wear debris, and measure the degree of radioactivity of the fluid carrying the debris either periodically during the test or at the conclusion thereof. Knowing the quantity of radiocative material in the test composition, and having measured the radioactivity of the fluid carrying the wear debris, the amount of wear can be readily calculated.

The wear-testing compositions may be made from metals such as iron, steel, copper, aluminum, zinc, and lead, alloys such as bronze, brass, babbitt, duraluminum, and steel alloys, glass, fiber, synthetic resins or plastics, or in fact any material having suitable physical and chemical properties, and which can be rendered radioactive either by the incorporation of radioactive substances or by subjecting the material to bombardment, for example, in a cyclotron.

Naturally radiactive substances which may be incorporated in the wear-test composition include radium compounds and uranium compounds.

However, I prefer to employ artificially activated elements, particularly the isotopes of the metals and metalloids, such as may be produced by bombardment with neutrons or deuterons in a cyclotron. The following table shows by way of example, some of the artificially activated elements which may be utilized.

| Source element | Bombardment | Radioactive isotope [1] | Half-life |
|---|---|---|---|
| B | Deuteron | $_6C^{11}$ | 21 minutes. |
| Mg | do | $_{11}Na^{22}$ | 3 years. |
| Na | do | $_{11}Na^{24}$ | 14.8 hours. |
| Si | do | $_{14}Si^{31}$ | 2.6 hours. |
| P | do | $_{15}P^{32}$ | 14.3 days. |
| S | do | $_{16}S^{35}$ | 88 days. |
| K | do | $_{19}K^{42}$ | 12.4 hours. |
| Fe | do | $_{25}Mn^{54}$ | 310 days. |
| Fe | do | $_{26}Fe^{59}$ | 47 days. |
| Fe | do | $_{27}Co^{56}$ | 270 days. |
| Cu | do | $_{29}Cu^{64}$ | 12.8 hours. |
| Cu | do | $_{30}Zn^{65}$ | 250 days. |
| As | Neutron | $_{33}As^{76}$ | 26.8 hours. |

[1] The subscript of the radioactive isotope produced by bombardment is the atomic number, and the superscript is the atomic weight.

In carrying out my method, I may subject a suitable substance, for example, red phosphorus, to bombardment in a cyclotron for a period of time sufficient to render the phosphorus radioactive. Phosphorus is particularly suitable, since when activated by bombardment, it has a half-life of 14.3 days. The phosphorus thus activated is added to the material which it is desired to subject to the wear-test, for example, cast iron, and the iron is melted, cast, and machined to the desired form, such as a piston ring, bearing or other suitable test piece. The test piece is then subjected to wear in the presence of a known quantity of a fluid capable of carrying the wear debris, for example, lubricating oil, and the radioactivity of the oil, due to the presence of the wear debris, is measured during the wear test or upon completion thereof. Such measurement may be made by means of a Geiger-Muller counter or other suitable device, and the amount of wear may be calculated from the radioactivity so measured. The wear test may be conducted, in the case of piston rings, pistons, or cylinder walls, by employing an internal combustion engine having such parts rendered radioactive by the incorporation of radioactive phosphorus or other radioactive substances. Wear tests upon other types of test pieces may be performed in conventional or specially designed apparatus, such as is currently employed in testing lubricants, including the Almen extreme pressure lubricant testing machine, the S. A. E. machine for testing hypoid gear lubricants, the Neely "Kinetic oiliness tester," or various modifications thereof.

In determining the wear of surfaces by measuring the radioactivity of the fluid carrying the radioactive wear debris, it is obvious that the test piece must be of substantially uniform composition, substantially uniformly radioactive, and susceptible of relatively uniform wear. Additionally, the radioactive wear debris should be homogeneously distributed throughout the fluid or lubricant employed in the test, and such fluid, if only a portion thereof is measured for radioactivity, should be representative of the entire quantity of fluid used. Unless these conditions are fulfilled, the amount of wear thus determined may be greater or less than the actual wear.

One very satisfactory method of determining wear in accordance with my invention is as follows:

The radioactive test piece, for example, cast iron containing radioactive phosphorus, is caused to wear by rotative engagement with bronze in the presence of hydrocarbon lubricating oil and an abrasive material. All of the oil carrying the radioactive wear debris that may be readily drained from the testing apparatus is removed therefrom and the radioactivity is measured by a Geiger-Muller counter. The testing apparatus, including the cast iron test piece, is thoroughly washed with a solvent for the oil, for example, ether, and the ether washings containing residual oil and wear debris are added to fresh lubricating oil, the ether is evaporated from the mixture, and the radioactivity of the remaining oil carrying the wear debris is measured by a Geiger-Muller counter. From the sum of the activities thus measured, the amount of wear may be calculated.

In determining relatively large amounts of wear both by weighing and by radioactive measurements, the following results were obtained.

| Loss by weight (mgs.) | Loss by radioactivity measurement (mgs.) | | |
|---|---|---|---|
| | Oil | Washings | Total |
| 23.6 | 19.68 | 4.22 | 23.9 |
| 23.5 | 16.31 | 0.39 | 22.7 |

In calculating wear from the radioactivity of the wear debris as measured by the Geiger-Muller counter, use is made of various units currently employed in the studies of radioactivity. The fundamental unit in radioactivity is the "curie," i. e., the amount of activity of one gram of radium. It has been found that one curie is equivalent to $3.7(10)^{10}$ bursts, or atomic disintegrations per second. The unit of the micro-curie, or one millionth of a curie, is equal to $3.7(10)^4$ bursts per second.

From studies of the activation of phosphorus in a cyclotron, it has been found that phosphorus acquires a radioactivity of 200 micro-curies per micro-ampere of current per hour of bombardment. Phosphorus subjected to a 10 hour bombardment in a cyclotron having a current of 20 micro-amperes acquired $200 \times 10 \times 20$ or $4(10)^4$ micro-curies.

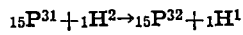

$$_{15}P^{31} + {}_1H^2 \rightarrow {}_{15}P^{32} + {}_1H^1$$

This material decayed with time, and in 14.3 days had one-half of that activity, or $2(10)^4$ micro-curies of activity. The total number of bursts from this amount of material was $2(10)^4 \times 3.7(10)^4$ or $7.4(10)^8$ per second, or about $4(10)^{10}$ per minute. The total amount of radioactive material (phosphorus) was incorporated in 200 grams of cast iron, each gram emitting $2(10)^8$ bursts per minute, or each milligram $2(10)^5$ bursts per minute.

The sample of cast iron containing the radioactive phosphorus was subjected to wear in the presence of 125 cc. of lubricating oil for a given period of time, and a 25 cc. sample of the oil was examined for radioactivity by means of a Geiger-Muller counter. This 25 cc. sample, of course, contained only ⅕ of the total wear debris. Thus for each milligram of total wear, there would be $4(10)^4$ bursts per minute, but since the particular Geiger-Muller counter used counts only ¹⁄₄₀ of all of the bursts from the sample, the number of counts per minute per milligram of total wear would be $1(10)^3$, or 1,000 counts per minute. However, since the Geiger-Muller counter is sensitive to radioactivity from sources other than the wear debris, for example, cosmic radiation, a background count must be made and a correction applied to the total count in order to obviate any errors due to radiation from an external source. The smallest count which can be determined with reasonable accuracy in a reasonable length of time is a count above background of 10 counts per minute. By counting the background for one hour, and the radioactive source (oil containing wear debris) plus the background for one hour, the count due to a source of 10 counts per minute may be determined with a probable error of 1 count per minute, or 10 per cent. This count of 10 per minute corresponds to 0.01 milligram of wear, determined to a probable error of 0.001 milligram. Thus, even with a relatively low count per minute, the sensitivity of the method of the present invention is far greater than that of prior methods involving the determination of change in weight or dimensions of the test piece.

In accordance with the present invention it is therefore possible to determine very minute amounts of wear, and also to determine the effect of various lubricants such as mineral oil, fatty oil, and oils containing additives, in preventing wear of surfaces.

The method of the present invention is particularly applicable to the determination of wear of specific parts while in use, for example, the determination of wear of an artificially radioactivated piston ring in an internal combustion engine, while the engine is in operation.

I claim:

1. The method of determining wear of a surface, which comprises providing a radioactive surface of substantially unaltered wear-resisting properties, subjecting said surface to wear in the presence of a fluid capable of carrying radioactive wear debris, and measuring the radioactivity of the fluid carrying said debris.

2. The method of determining wear of relatively moving surfaces, which comprises providing a pair of surfaces at least one of which is radioactive and of substantially unaltered wear-resisting properties, causing wear between said surfaces in the presence of a fluid capable of carrying radioactive debris resulting from wear of the radioactive surface, and measuring the radioactivity of the fluid carrying said debris.

3. The method of determining wear of a surface, which comprises providing a radioactive surface of substantially unaltered wear-resisting properties, subjecting said surface to wear in the presence of a lubricant capable of carrying radioactive wear debris, and measuring the radioactivity of the lubricant carrying said debris.

4. The method of determining wear of relatively moving surfaces, which comprises providing a pair of surfaces at least one of which is radioactive and of substantially unaltered wear-resisting properties, causing wear between said surfaces in the presence of a lubricant capable of carrying radioactive debris resulting from wear of the radioactive surface, and measuring the radioactivity of the lubricant carrying said debris.

5. The method of determining wear of a metal surface, which comprises providing a metal surface homogeneously radioactive of substantially unaltered wear-resisting properties, subjecting said surface to wear in the presence of a fluid capable of carrying radioactive wear debris, and measuring the radioactivity of the fluid carrying said debris.

6. The method of determining wear of a metal surface, which comprising incorporating in said surface a radioactive substance without substantially altering the wear-resisting properties of said surface, subjecting said surface to wear in the presence of a fluid capable of carrying radioactive wear debris, and measuring the radioactivity of the fluid carrying said debris.

7. The method of determining wear of a metal surface, which comprises providing a metal surface homogeneously radioactive and of substantially unaltered wear-resisting properties, subjecting said surface to wear in contact with a fluid capable of carrying radioactive wear debris, withdrawing portions of said fluid from contact with said surface at intervals, and measuring the radioactivity of said fluid.

8. The method of determining wear of a metal surface, which comprises providing a metal surface homogeneously radioactive and of substantially unaltered wear-resisting properties, subjecting said surface to wear in contact with a lubricant capable of carrying radioactive wear debris, withdrawing portions of said lubricant from contact with said surface at intervals, and measuring the radioactivity of said lubricant.

9. The method of determining wear of a metal surface which comprises incorporating in said surface radioactive phosphorus without substantially altering the wear-resisting properties of said surface, subjecting said surface to wear in the presence of a fluid capable of carrying radioactive wear debris, and measuring the radioactivity of the fluid carrying said debris.

10. A wear-testing composition comprising a ferrous metal to which has been added radioactive phosphorus, said ferrous metal having substantially unaltered wear-resisting properties.

SEYMOUR W. FERRIS.